UNITED STATES PATENT OFFICE.

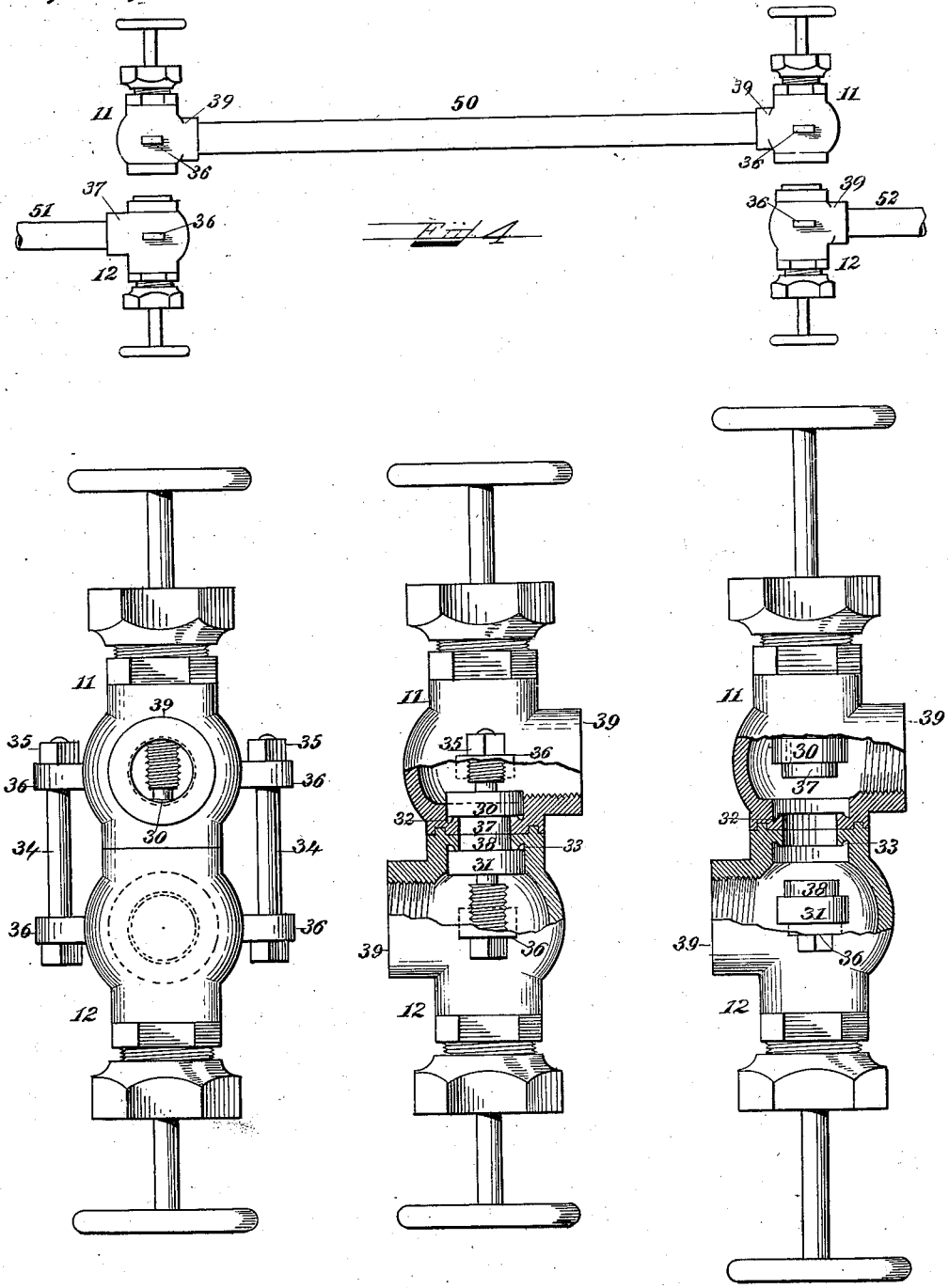

WILLIAM T. RAY, OF SOMERVILLE, MASSACHUSETTS.

VALVE.

1,000,945. Specification of Letters Patent. Patented Aug. 15, 1911.

Original application filed March 28, 1910, Serial No. 551,827. Divided and this application filed December 27, 1910. Serial No. 599,485.

*To all whom it may concern:*

Be it known that I, WILLIAM T. RAY, a citizen of the United States, residing at Somerville, in the county of Middlesex and State of Massachusetts, have invented a certain new and useful Valve, of which the following is a specification, reference being had therein to the accompanying drawings.

Where it is necessary to break the connection between two pipes, and stop the liquid or gas contained therein from flowing out, there is usually provided in each of the two adjacent end portions of the pipes, on each side of the connection, a separate valve; the communication between the valves being through the connection. When the valves are closed, previously to breaking the connection, the gas or liquid becomes confined in the space between the valves; and, upon breaking the connection, is exposed to the atmosphere. If the liquid or gas is under a pressure above that of the atmosphere, it will escape with a rush, and, perchance, do damage, as for example, in the case of a steam or compressed-air train-pipe coupling. Often, if such a coupling is broken near the ground, dirt and pebbles are violently thrown into the face and eyes of the operator. If ammonia were the liquid or gas in such intervening space between the valves, it would escape so rapidly into the atmosphere, as to endanger life and health, and what is more, if the operator's hands were on the coupling connection and in the field of the escaping ammonia, they would be in great danger of being frozen stiff. Further, it may be readily imagined that in this space between the valves, there might be more or less of a vacuum, and that the connections might be such that the vacuum could not be destroyed and the connection broken, without delay and inconvenience. In fine, all of the above objections arise from the fact that there is a confined space between the two valves when they are closed.

Now the object of my invention is to provide means whereby, when the valves are closed, this intervening space becomes *nil*. I attain this object by what I term a new twin-valve coupling, which is described but not claimed in application for United States Letters Patent for ice making machines, Serial No. 551,827, filed by me March 28th, 1910, of which application, the present one is a division. This twin-valve coupling comprises two coupling members each of which has a valve and seat, so designed that when the two members of the coupling are secured together and the valves have found their seats, all of the space intervening between the two valve seats, is filled by portions of the valves. Consequently, when the coupling is broken, *i. e.* when one member with closed valve, is separated from the other member with its valve, there is no liquid or gas to escape, for all of said liquid or gas was excluded from said space when the valves found their seats. Obviously, also, if a section of pipe, is by means of my twin-valve coupling removably connected to two other pipes, the three pipes with the two twin-valves open, may serve as a single conduit, say for ammonia; and if for any reason it is desired to remove the said section with its contents without the escape of liquid or gas, all that is required is the closing of the two twin-valves and breaking the connections.

This invention is of great practical value in making connections between pipes employed in refrigerating systems using anhydrous ammonia as a refrigerant; and the above mentioned parent application illustrates one of the many environments in which my invention may be used, but I do not wish it to be understood that my invention is intended for use only as an ammonia valve for such is not the case; my desire being to cover all devices employing the principle involved, whatever may be the use to which they may be put.

In the drawings illustrating the principle of my invention and the best mode now known to me of embodying the same, I have shown my invention in a form suitable for use in connection with piping employed in an anhydrous ammonia refrigerating system.

Figure 1 is a front elevation of my twin-valve coupling. Fig. 2 is a side elevation of the said coupling with portions of its side broken out to show how, when the valves are in their seats, and the members of the coupling are ready to be separated, all ammonia has been excluded from the space between the valve seats, and there is no anhydrous ammonia to escape when the coupling is parted. Fig. 3 is a similar view to show the passageway through the coupling, and particularly the valve seats and the form of the valves whereby all of the passageway between the valve seats is filled when the valves find and remain in their seats. Fig. 4 is an elevation showing a section of piping, and two pipes, provided with a pair of my twin-valve couplings; the coupling members and pipes being separated, and their valves being closed, as shown in Fig. 2.

My twin-valve coupling comprises two coupling members 11, 12, within which are provided valves 30, 31, Figs. 2 and 3, and seats 32, 33. The abutting faces of the coupling members 11, 12, are provided with a male and female joint, and are secured in normal position by bolts 34, Fig. 1, and nuts 35 which engage a pair of ears 36 on the outside of each member. When the valves are in their respective seats, see Fig. 2, the communicating space between the seats 32, 33, is filled by the portions 37, 38, of the valves which extend toward each other and substantially abut each other. Each coupling member is provided with a lateral connection 39 whereby it may be connected to one of the two pipes to be united, as shown, for example, in Fig. 4.

By moving the valves 30, 31, off their seats 32, 33, Fig. 2, communication is opened up through the coupling members, see Fig. 3; when one valve, as 30, Fig. 3, is turned and finds its seat 32, as in Fig. 2, the portion 37 of the valve, fills the space between its seat 32, and the valve outlet; and when the second valve 31 is turned and finds its seat 33, the outside face of the portion 38 of the valve 31, abuts the corresponding face of the portion 37 of the valve 30, at the moment the second valve 31 finds its seat 33. In other words, when the two valves seal their respective coupling members, all of the gas or liquid in the two members of the coupling is excluded from the space between the two valve seats 32, 33; and by removing the nuts 35, Fig. 1, and the bolts 34 from the ears 36, the abutting coupling members 11, 12, Fig. 2 may, as appears from Fig. 4, be separated without the escape of any liquid or gas, for there is none between the two valve seats, to escape.

The value of the construction indicated in Fig. 4 may be further made evident, if we assume that the section of piping 50 be a coil in a market refrigerator, and that it must be taken out of the refrigerating system and removed, say, because there is a break and a leak in the coil which should be repaired, or because a new coil is to be substituted. If this coil and connecting pipes 51, 52, were not equipped with my twin-valve coupling 11, 12, that is, if this coil had ordinary couplings with no valves, the ammonia in the coil would, for four or five hours, have to be pumped out through the mains connected with the refrigerating machine, before the couplings could, with safety, be broken apart; and even then, when they were broken, a strong odor of ammonia would issue from the mouths of the open connections and interfere with the presence of customers and impregnate the market produce. Further if there were other markets on the line of refrigeration, this pumping out of the coil, previous to breaking the connections, would stop refrigeration also in all the other markets until the defective refrigerator was supplied with a proper coil. Now from this, and what has previously been said, obviously where refrigerating coils or pipes use my twin-valve coupling 11, 12, the valves 30, 30, 31, 31, see Figs. 2 and 3, may be at once closed, and the coil or pipe 50, Fig. 4, at once removed and a new coil immediately substituted, without the probable delay of four or five hours required in pumping out, before the connections could be broken; and, further, without stopping refrigeration during that time at the other markets; and lastly without the escape of any gas or liquid arising from the disconnection of the pipes; and what is more, the defective coil, say 50, after it is disconnected, can, with its contained ammonia, be taken to a repair station and pumped out, and the coil repaired or disposed of. Still further, if refrigerating pipes 51, 52, have my twin-valve couplings, the coil, say 50, to be substituted may be filled with ammonia at the repair station, the valves 30, 30, closed, the coil and contents removed to the refrigerator, the connections between the coupling members 11, 12, completed, and all of the valves 30, 30, 31, 31, opened without the possibility of introducing air into the refrigerating system, and without the necessity of using the obnoxious process heretofore required at the market of "stinking out" the air from the new coil before connecting up the coil with the system. In short, by means of my invention, it is possible to remove a section of pipe from the other pipes connected therewith, without the escape of any of the contents of any one of the pipes; and the disconnected pipes can be connected without introducing any new liquid or gas into the system.

Having described the construction and operation of my invention, and desiring to protect it in the broadest manner legally possible, what I claim is:

1. A twin-valve coupling made up of two members; means to removably secure them together; a valve seat in each of said members; a valve for each member; and means to close the space between said seats when said coupling members are secured together and said valves are in their seats; all designed to prevent the escape of liquid or gases when the said coupling members are broken apart.

2. A twin-valve coupling made up of two members; means to removably secure them together; a valve seat in each member; two valves, one for each member, said valves having a common axis and having portions projecting beyond said seats to close the space between said seats when said coupling members are secured together and said valves are in their seats; all designed to prevent the escape of liquid gases or when the said couplings are broken apart.

In testimony whereof I affix my signature in presence of two witnesses.

WILLIAM T. RAY.

Witnesses:
E. F. UNIAC,
F. J. V. DAKIN.